W. H. SCOTT.
CONNECTION WITH BRUSHES FOR ELECTRIC MOTORS OR DYNAMOS.
APPLICATION FILED JUNE 20, 1916.
1,315,796.
Patented Sept. 9, 1919.
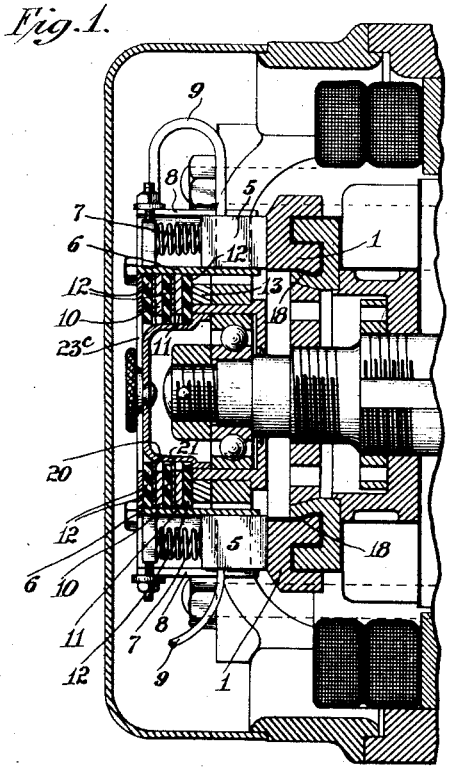
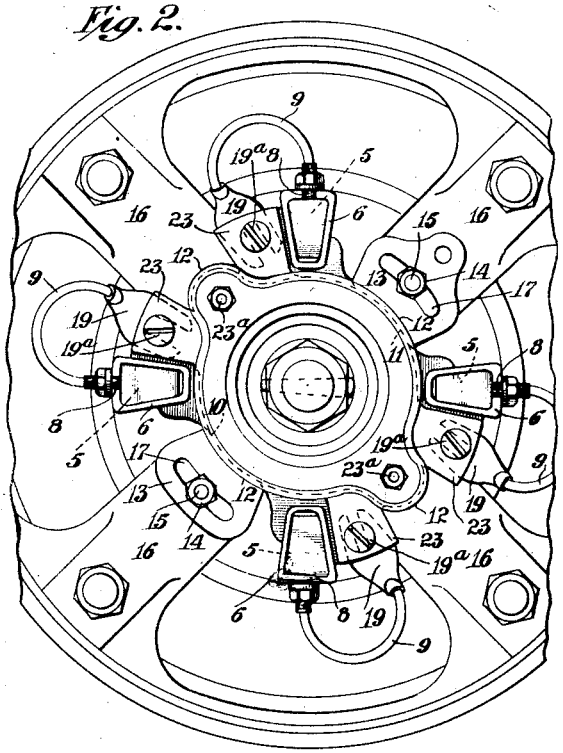
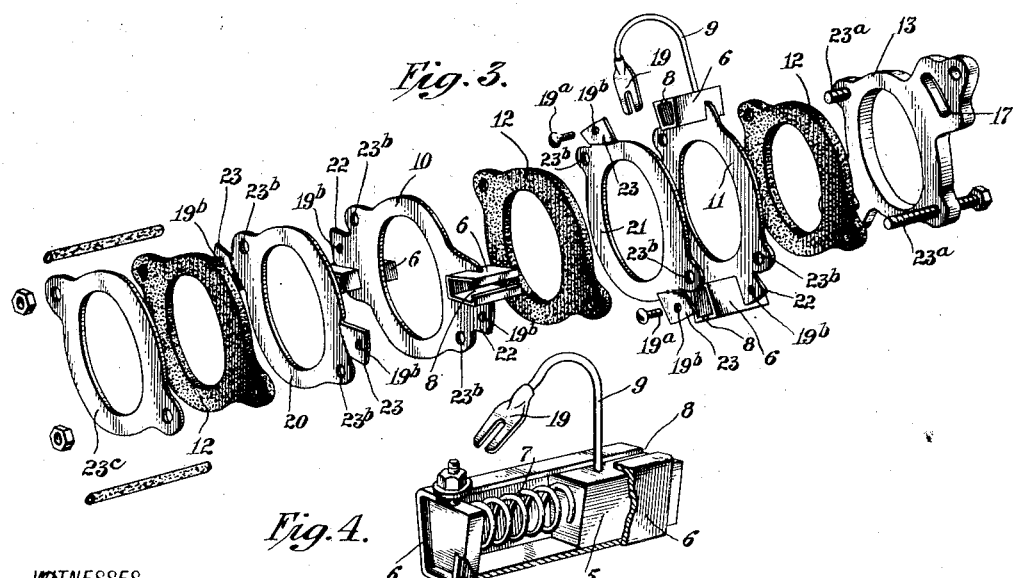
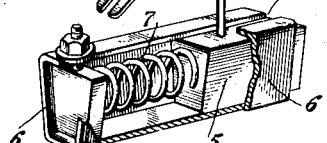
INVENTOR
WILLIAM H. SCOTT
BY
ATTORNEYS

UNITED STATES PATENT OFFICE.

WILLIAM HARDING SCOTT, OF NORWICH, ENGLAND.

CONNECTION WITH BRUSHES FOR ELECTRIC MOTORS OR DYNAMOS.

1,315,796.      Specification of Letters Patent.      Patented Sept. 9, 1919.

Original application filed May 20, 1915, Serial No. 29,378. Divided and this application filed June 20, 1916. Serial No. 104,816.

*To all whom it may concern:*

Be it known that I, WILLIAM HARDING SCOTT, a subject of the King of Great Britain, residing at Gothic Works, Norwich, in the county of Norfolk, England, have invented new and useful Improvements in Connection with Brushes for Electric Motors or Dynamos, of which the following is a specification.

My invention relates to electric motors, or dynamos, especially those intended for starting, or igniting, the internal combustion engines of motor road-vehicles, and for other purposes where the weight should be as small, and the arrangement as compact, as possible, although it is not limited to these.

I may remark that I prefer to use a number of poles not, in any case, less than four, while for starting-motors fixed on the crank-shaft, or gear-box shaft, I prefer that the number of poles shall not be less than eight and it may even, in some cases, be as many as sixteen, but I do not limit myself to any particular number.

According to my invention, which is a division of my application for patent, Serial No. 29378, the brush-gear comprises brushes each carried in a box which allows them to slide in a direction parallel to the axis of the motor shaft and press upon radially disposed commutator sections arranged in a plane cutting at right angles the axis of the motor shaft. These boxes are slotted to accommodate the conductors and are fixed to conductive insulated ring-plates which constitute brush box carriers. The brushes carried by the boxes on one ring-plate alternate with those carried by the other ring-plate, and the ring-plates are arranged, or carried, so that they can be adjusted and fixed to give any required brush lead. The said ring-plates constitute electrical conductors and are connected to the circuit in any suitable way. The support for the brushes thus carried is mounted on the shaft of the motor preferably outside the bearing bracket which supports the shaft at that end.

I will describe, with reference to the accompanying drawings, how my invention may be performed.

Figure 1 is a longitudinal median section through the broken end of an armature in which my invention is embodied;

Fig. 2 is a broken end elevation thereof with the dust cap removed;

Fig. 3 is a detached perspective of the brush carriers and associated members, certain of the elements being omitted in the interest of clarity; and Fig. 4 is a broken perspective of one of the brush boxes.

The commutator sections (Fig. 1) are arranged radially in a plane at right angles to the axis of the motor shaft and are shown as being secured in place as explained in my application for patent Serial No. 174,566, but I do not limit myself to radial commutator sections secured in that particular way.

The construction of the brush arrangements according to my present invention is as follows:—The brushes 5, are each carried in a box 6, in which the brush can slide, under the action of a spring 7, in directions parallel with the axis of the armature. Each box has in it a slot 8, through which passes the conductor 9, and each alternate box is secured to a metal ring-plate 10, and the other boxes are secured to another metal ring-plate 11. The conductors 9, are connected to their respective brushes 5, and to conductive pieces 19, secured between the lugs 22 on the ring-plates 10 and 11, and the lugs 23, on the cover ring-plates 20 and 21. The ring-plates 10 and 11, are insulated from each other, and from the earth, by means of the insulating plates 12, and they are clamped to, and insulated from, a rocker 13, which can be turned angularly through a partial rotation on the shaft of the machine, to get the required lead of the brushes, and be fixed by nuts 14, screwed on bolts 15, fixed to the frame work 16, and passed through slots 17, in ears on the said rocker 13, as shown in Fig. 2. The metal ring-plates 10, and 11, which constitute the electrical conductors for the brushes, can be connected up in the circuit in any usual or suitable way.

The connection of all the aforesaid parts is shown more clearly in Figs. 1 and 2. 19ª are the screws which are screwed up to pinch the conductive pieces 19 in place; the holes shown at 19ᵇ are for receiving these screws. The whole of the plates and insulation are connected together by insulated bolts 23ª, passed through holes in the various parts, some of these holes being seen at 23ᵇ, and the ensemble is mounted on the motor shaft preferably outward of the bracket which supports the said shaft at that end.

In Fig. 1 at 23°, is shown a thin outer plate to cover and protect the parts.

I claim:—

1. The combination with an electric motor or dynamo having its commutator sections lying in a plane transverse to the motor axis, of a brush gear comprising a pair of ring plates insulated from each other, conductors electrically connected. respectively to said plates, transverse brush boxes on each plate, those on one plate alternating with those on the other plate, brushes mounted in said boxes and sliding therein in a direction substantially parallel to the axis of the motor shaft, and means for securing the plates in proper position with relation to the armature.

2. In a construction such as specified in claim 1, means for adjustably securing the plates in proper position with relation to the armature.

3. In a construction such as specified in claim 1, plate securing means comprising a rocker carrying said plates but insulated therefrom, and means associated with said rocker for securing the parts in angularly adjustable position with relation to the armature to give any required lead to the brushes.

4. In an electric motor or dynamo, a pair of ring plates, brushes carried thereby, cover plates associated with each ring plate and a conductor extending from each brush to its ring plate and clamped thereto by the associated cover plate.

5. A brush mounting comprising a substantially flat ring lying in a plane transverse to the axis of the motor and having a lug projecting integrally from one edge of the ring, together with a box-like brush holder associated with said lug and lying in a plane parallel with the axis of the motor and in which the brush is adapted to be slidably secured with its bearing face presented in a plane parallel to that of the carrier ring.

6. A brush mounting comprising a substantially flat ring having an integral terminal lug at its edge, a brush holder mounted on said ring in proximity to said lug, a brush sliding in said holder, and a flexible conductor connecting the brush and lug.

7. A brush mounting comprising a substantially flat ring having an integral terminal lug at its outer edge, a brush holder supported at said outer edge of the ring in proximity to said terminal lug, a brush sliding in said holder, and a flexible conductor connecting the brush and lug.

8. A brush mounting comprising a pair of flat rings of substantially like diameter juxtaposed on the same axis but insulated from each other, terminal lugs on the said rings, brush boxes supported from the edges of said rings, those of one ring alternating with those of the other, brushes slidably mounted in said boxes, and conductors connecting the brushes of one ring with the terminal lugs on that ring.

9. In a dynamo-electric machine, the combination with the frame thereof, of two brush mounting devices, each comprising a substantially flat ring and a plurality of brush-supporting members connected with the ring at an edge thereof, said rings being superposed but insulated from each other, with the brush-supporting members in angularly spaced, alternating positions, and means fastening the rings to the head of the frame coaxially with the armature shaft.

In testimony whereof I have signed my name to the specification in the presence of two subscribing witnesses.

WILLIAM HARDING SCOTT.

Witnesses:
G. F. TYSON,
EDWD. GEO. DAVIES.